(12) United States Patent
Jacobs

(10) Patent No.: US 8,429,039 B1
(45) Date of Patent: Apr. 23, 2013

(54) METHOD AND APPARATUS FOR TAX REFUND ALLOCATION

(75) Inventor: Judd C. Jacobs, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 13/178,228

(22) Filed: Jul. 7, 2011

Related U.S. Application Data

(63) Continuation of application No. 11/529,167, filed on Sep. 28, 2006.

(51) Int. Cl.
*G06F 17/22* (2006.01)
*G07F 19/00* (2006.01)

(52) U.S. Cl.
USPC .............................................. 705/31

(58) Field of Classification Search ........... 705/31
See application file for complete search history.

(56) References Cited

U.S. PATENT DOCUMENTS

| | | |
|---|---|---|
| 4,890,228 A | 12/1989 | Longfield |
| 5,193,057 A | 3/1993 | Longfield |
| 5,724,523 A | 3/1998 | Longfield |
| 5,963,921 A | 10/1999 | Longfield |
| 6,202,052 B1 | 3/2001 | Miller |
| 6,697,787 B1 | 2/2004 | Miller |
| 7,010,507 B1 | 3/2006 | Anderson et al. |
| 7,177,829 B1 | 2/2007 | Wilson et al. |
| 7,234,103 B1 | 6/2007 | Regan |
| 7,249,073 B1 | 7/2007 | Lesk |
| 7,257,553 B1 | 8/2007 | Baker |
| 2003/0093319 A1 | 5/2003 | Jarman |
| 2004/0054685 A1 | 3/2004 | Rahn et al. |
| 2004/0193541 A1 | 9/2004 | Lasater et al. |
| 2005/0203857 A1 | 9/2005 | Friedman |
| 2007/0156581 A1 | 7/2007 | Imrey et al. |
| 2008/0065396 A1 | 3/2008 | Marshall |
| 2008/0082431 A1 | 4/2008 | Bekker |

OTHER PUBLICATIONS

"Minnesota Department of Revenue Collection Manual", Minnesota Revenue, Oct. 2005, 183 pages.
"The Federal Tax Offset Process", EdFund, Jan. 1, 2003, 2 pages.
"Office of Child Support Environment", Jan. 1, 2005, 2 pages.
State of Michigan, Request and Writ for Garnishment (Income tax refund/credit), MC 52, Jan. 10, 2004 (3 pages).

*Primary Examiner* — Seye Iwarere
(74) *Attorney, Agent, or Firm* — Osha Liang LLP

(57) ABSTRACT

Method and apparatus for tax refund allocation in tax programs. A tax program may include a tax refund allocation component and user interface that allows a taxable entity to allocate portions of a refund from one tax authority to pay taxes due to another tax authority. The component and user interface may also be used to allocate portions of tax refunds to other institutions than tax authorities. Once the tax refund allocation process is completed, a message or messages indicating the allocation instructions may be sent to a financial institution that acts as an intermediary between the taxable entity, the tax authority(s), and the other institutions. The financial institution may receive the tax refund from the tax authority and distribute the portions of the refund to the other tax authorities and/or institutions as directed by the received allocation instructions.

4 Claims, 11 Drawing Sheets

```
<Identification information for taxable entity>

Tax authority: <Tax authority 230B>
Type: <Refund>
Amount: <Refund amount>
Distribution:
<Payment to tax authority 230A>
<Amount>
<Payment to other institution(s)>
<Amount(s)>
<Balance to taxable entity, if any>

Tax authority: <Tax authority 230A>
Type: <Tax obligation>
Amount: <Tax amount>
Payment methods:
<Refund from tax authority 230B>
<Amount>
<Other payment source(s)>
<Amount(s)>
```

Allocation instruction message 250

*Figure 4*

| Menu 1  Menu 2  Menu 3  Menu 4 | Menu bar 352 |
| □ △ ⌂ ○ ☆ | Tool bar 354 |
| Tab 1 / Forms \ Tab 3 \ / Tab 4 \ | Tab bar 356 |

MODULES

Module 1
Module 2
...

FORMS

Form 1
Form 2
Form 3
Form 4
...

Current tax document 320 (Form 1)

Description................................................................ Field 322A Description................................................................ Field 322B Description................................................................ Field 322C Description................................................... Field 322D Description................................................................ Field 322E Description................................................................ Field 322F Description................................................... Field 322G Display 350      Complete Tax Return 330

*Figure 5*

```
->Your Federal refund is $1,125.00                                    Display
                                                                      400A
->You owe the State of California $327.00.

Would you like to apply some or all of your refund to what you owe the State of
California?

❑  Yes.
❑  No.

Cancel              <Back    Next>
```

*Figure 6A*

```
How much of your Federal refund ($1,125.00) would you like to apply to the State of
California?

$ [  327.00  ]

->You owe the State of California $327.00
->You have applied a payment of $327.00
                                                                      Display
->Your balance due to the State of California is $0.00                400B Cancel              <Back    Next>
```

*Figure 6B*

```
->You owe the State of California $327.00
->You have applied a payment of $127.00                    Display
                                                            400C
->Your balance due to the State of California is $200.00

❏ Pay remainder by check.
❏ Pay remainder by EFT (credit card, debit card, etc.)

Cancel          <Back    Next>
```

*Figure 6C*

```
->You have $798.00 of your Federal refund remaining.

Would you like to apply the remainder toward any other bills, credit card debt, etc.?

❏ Yes.
❏ No.                                                      Display
                                                            400D Cancel          <Back    Next>
```

*Figure 6D*

What institution would you like to apply payment to?

| XYZ | [Search]

XYZ is in our database. Please enter your account number.

| 12345678 | [Submit]

We have located your account information. How much of your refund would you like to apply to XYZ?

$ | 65.47 |

Display
400E

Cancel        <Back   Next>

*Figure 6E*

->Your refund from <tax authority> is $<amount>

Would you like to allocate some or all of your refund to other taxes or to other institutions?

❏ Yes.
❏ No.

Display
500A

Cancel      <Back    Next>

*Figure 7A*

What tax authority or institution would you like to apply a portion of the tax refund to?

| California | [Search]

Display
500B

Cancel      <Back    Next>

*Figure 7B*

METHOD AND APPARATUS FOR TAX REFUND ALLOCATION

CROSS-REFERENCE TO RELATED APPLICATIONS

This application is a continuation of U.S. patent application Ser. No. 11/529,167, filed on Sep. 28, 2006, and entitled: "METHOD AND APPARATUS FOR TAX REFUND ALLOCATION." Accordingly, this application claims benefit of the filing date of U.S. patent application Ser. No. 11/529,167 under 35 U.S.C. §120. U.S. patent application Ser. No. 11/529,167 is hereby incorporated in its entirety.

BACKGROUND

Tax preparation software programs (hereinafter referred to as "tax programs") are available from various vendors that assist tax preparers in preparing accurate tax returns and other tax forms for filing by or on behalf of a taxable entity with a governmental entity, e.g., a Federal, State, county, city, district, and/or other municipality (hereinafter collectively referred to as tax authorities). These tax programs guide the tax preparer through tax return processes for various tax authorities, and may automatically perform necessary tax preparations in accordance with data input and forms, schedules, tax data, tables, and formulas stored with or coded into the program. Personal and/or business tax programs may be provided. In addition, both personal and professional versions of tax programs may be offered. Professional versions may be used by tax preparation professionals to prepare various tax returns for multiple taxable entities. Further, these tax programs may be used to prepare annual taxes, quarterly taxes, etc for filing with various tax authorities by or on behalf of taxable entities.

Typically, the tax preparer will enter necessary data and information via the user interface of the tax program, and, when done, access the user interface to direct the tax program to complete the tax return under preparation. The tax program may perform any necessary calculations using the entered data and information and in accordance with tax formulas relevant to the particular tax return under preparation (e.g. Federal tax return, State tax return, local tax return, etc.), and possibly data and information from other sources such as previous tax returns or other tax-related documents, to generate appropriate calculated values for certain fields of the tax return under preparation.

The completed tax return may indicate that the taxable entity owes taxes to the tax authority or that the taxable entity is owed a tax refund from the tax authority. The tax return may then be filed (electronically or conventionally) with the tax authority. If taxes are due, the tax amount may be, but is not necessarily, paid to the tax authority by the taxable entity at the time of filing. Conventionally, the tax payment may be transferred electronically or alternatively may be paid by check. If a refund is due, the refund amount may be paid to the taxable entity by the tax authority either electronically to an account (e.g., a bank account) of the taxable entity or by check.

A taxable entity may be required to file tax returns with two or more tax authorities. For example, in some States, residents may be required to file both Federal and State income tax returns. In this case, the tax program may be used to prepare a separate tax return for each tax authority with which the taxable entity is required to file a tax return. In some cases, a taxable entity may end up owing taxes to a first tax authority while being due a refund from a second tax authority. Conventionally, the taxable entity pays the taxes to the first tax authority electronically or alternatively by a mailed payment, e.g. a check, from an account (e.g., a bank account) of the taxable entity. The taxable entity separately receives a refund from the second tax authority electronically or alternatively by a mailed payment, e.g. a check.

SUMMARY

Various embodiments of a method and apparatus for tax refund allocation in tax preparation software programs (hereinafter referred to as tax programs) are described. In embodiments, a tax program may include a tax refund allocation mechanism that allows a taxable entity to allocate or direct at least a portion of a refund from one tax authority to be used in paying at least a portion of taxes due to another tax authority. In one embodiment, the tax refund allocation mechanism may also be used to allocate or direct at least a portion of tax refunds to be used to pay other existing debts or obligations owed to other institutions, such as credit card debts.

A taxable entity may be required to file tax returns with two or more tax authorities. For example, in some States, residents may be required to file both Federal and State income tax returns. In this and other cases where a taxable entity has tax obligations to two or more tax authorities, a tax program may be used to prepare a separate tax return for each tax authority with which the taxable entity is required to file a tax return. In some cases, a taxable entity may end up owing taxes to a first tax authority while being due a refund from a second tax authority.

Embodiments may provide a tax refund allocation mechanism and tax refund allocation component and user interface of a tax program that allows a taxable entity (or a preparer on behalf of a taxable entity) to allocate or direct at least a portion of a refund due to one tax authority to pay at least a portion of taxes owed to another tax authority. In one embodiment, the tax refund allocation mechanism may also be used to allocate or direct at least a portion of tax refunds to other entities or institutions than tax authorities for payment of existing debts or obligations of the taxable entity, such as to pay portions or all of credit card or other debts or obligations to various financial institutions.

In one embodiment, a preparer may prepare one or more tax returns for one or more tax authorities using a tax program. If at least one of the tax returns indicates a tax refund due to the taxable entity for which the refunds are prepared, the tax program may provide a user interface (e.g., one or more displays) whereby the preparer may allocate portions of the indicated return to other institutions, for example to taxes owed according to other tax returns to other tax authorities, or to debts owed to other financial institutions. The user interface may allow the preparer to specify the one or more other institutions, and the amount from the refund to be allocated to each institution for payment of an existing debt or obligation of the taxable entity. Once the tax refund allocation process is completed, a message or messages indicating the allocation instructions may be sent to an entity, for example a financial institution, that acts as an intermediary between the taxable entity, the tax authority(s), and the other institutions. In one embodiment, allocation instructions may be sent electronically, for example via the Internet. The financial institution may then receive the tax refund from the tax authority and distribute the portions of the refund to the other tax authorities and/or institutions as directed by the received allocation instructions in payment of existing debts or obligations. Note that any remaining balance of the refund may be sent to the taxable entity.

It may be the case that a payment is due to one tax authority or to another institution before a tax refund from another tax authority is received. In one embodiment, a financial institution that serves as an intermediary for funds transfers may provide a service that allows the advanced payment of taxes to a tax authority or payment to another institution prior to the receipt of a tax refund from another tax authority. In other words, the financial institution may extend a line of credit to the taxable entity that will pay an outstanding debt in advance of receiving a tax refund for which a portion is allocated to pay the debt as indicated in allocation instructions sent to the financial institution.

BRIEF DESCRIPTION OF THE DRAWINGS

FIG. 4 illustrates exemplary allocation instructions that may be sent from a tax program to a financial institution that serves as a funds transfer intermediary for taxable entities, tax authorities, and other institutions, according to one embodiment.

FIG. 5 illustrates an exemplary, generic display and user interface for preparing tax returns that may be provided by a tax program according to one embodiment.

FIGS. 6A through 6E illustrate exemplary user interface displays and elements for a tax refund allocation component of a tax program according to one embodiment.

FIGS. 7A and 7B illustrate exemplary alternative user interface displays and elements for a tax refund allocation component of a tax program according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for tax refund allocation in tax preparation software programs (hereinafter referred to as tax programs) are described. In embodiments, a tax program may include a tax refund allocation mechanism that allows a taxable entity to allocate or direct at least a portion of a refund from one tax authority to be used in paying at least a portion of taxes due to another tax authority. In one embodiment, the tax refund allocation mechanism may also be used to allocate or direct at least a portion of tax refunds to be used to pay other debts, such as credit card debts.

Figure 1:
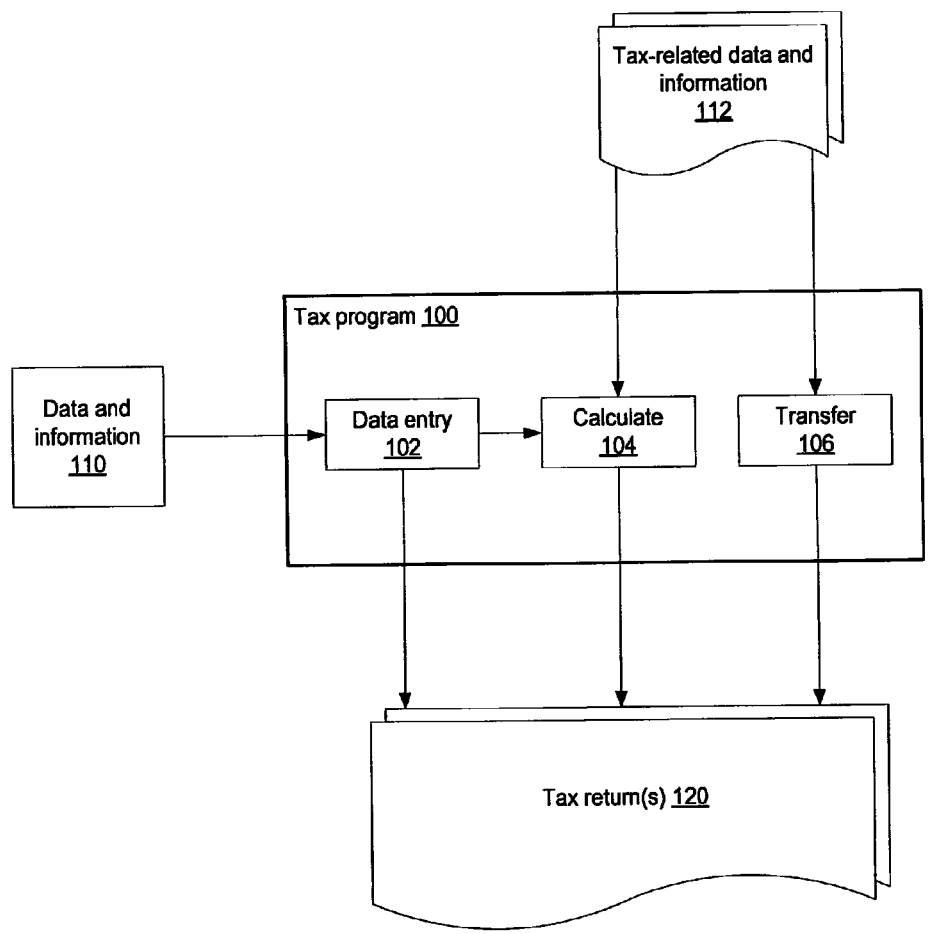
FIG. 1 illustrates the preparation of tax returns using a tax program according to one embodiment.

FIG. 1 illustrates the preparation of tax returns using a tax program according to one embodiment. Tax program 100 may be a personal or professional version. Professional versions may be used by tax preparation professionals to prepare various tax returns for multiple customers. Tax program 100 may be configured to guide the tax preparer through income, property, sales, or other type of tax return processes for a tax authority (e.g., a Federal, State, county, city, district, or other municipality tax authority) step-by-step, and may automatically perform necessary tax preparations in accordance with data input, forms, schedules, tax-related data, tables, and formulas stored with or coded into the program.

Figure 9:
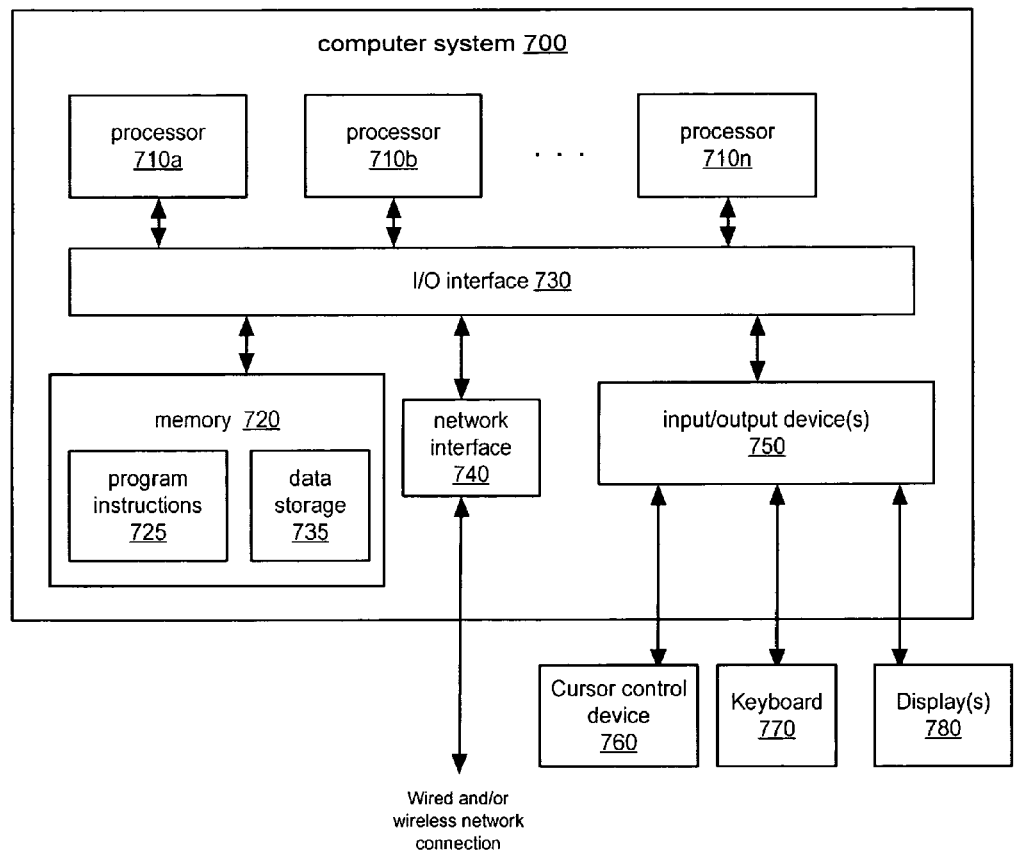
FIG. 9 illustrates an exemplary computer system on which embodiments may be implemented.

An instance of tax program 100 may be installed and executed on a computer system. The computer system may typically be, but is not limited to, a personal computer (PC) such as a desktop computer, laptop, or notebook computer. An exemplary computer system on which an instance of tax program 100 may be implemented is illustrated in FIG. 9. Alternatively, tax program 100 may be a network- or web-based tax return preparation program which a preparer may access (e.g., via a web browser or other application on the preparer's local computer system) to prepare various tax forms via a network connection to a remote computer system (e.g., a server), without necessarily installing a tax program on the local computer system.

A preparer may access or execute tax program 100 to prepare a tax return for a taxable entity. The taxable entity may be the preparer, or may be another taxable entity for which the preparer is preparing the tax return. Note that the taxable entity may be a person, a business, or other entity for which a tax return is to be prepared. Further, the taxable entity may represent two persons that file joint tax returns. The tax return may be a current tax return being prepared for filing for a current tax period, a previously filed tax return being amended, or a tax return being prepared in advance for a future tax period.

Tax program 100 may provide a user interface to guide or step the preparer in the preparation of one or more tax returns 120. Different areas for preparing tax returns for different tax authorities may be identified as different modules in tax program 100. A tax return under preparation may be associated with a particular module (e.g., 1040 federal returns, individual state returns, 1120 federal, corporate state returns, etc.) in the tax program. Thus, tax program 100 may provide a user interface that allows the preparer to select an appropriate module from among two or more modules for preparing a tax return for filing with a particular tax authority.

Tax programs typically include tax documents—the various forms, schedules, worksheets, data entry displays, etc. needed to prepare and file tax returns 120. For example, Federal tax return forms that may be provided may include, but are not limited to, 1040, 1040A, 1040EZ, 1040NR, and 1040X forms. As another example, various tax forms and schedules for various States or other municipalities may be included. In some implementations, these tax documents may be graphically presented by the tax program to the tax preparer on a display device (e.g., a computer monitor or screen of a hand-held device such as a PDA). Typically, a tax program will provide a data entry mechanism 102 via a user interface with various user interface elements (menus, dialog boxes, etc.) and user-selectable interface items (menu items, buttons, controls, text entry boxes, etc.) whereby the preparer may access the documents as needed and enter or modify data on the various tax documents using one or more data entry/ cursor control mechanisms, such as a keyboard and mouse. These documents may be presented on the user interface as templates that, when partially or completely filled out, may be "saved" for the particular taxable entity for which the documents are prepared.

In addition, one or more of the values from previous tax return information and/or from other sources or documents may be transferred 106 into or used in the calculation 104 of values for fields of the electronic tax documents. Further, values from a field or fields on one or more electronic tax documents may be transferred 106 to other electronic tax documents. For example, a calculated value from a worksheet or form may be transferred into or used in the calculation of a field on another electronic tax document.

Instead of or as an alternative to entering the necessary data and information directly to the electronic tax documents (e.g., directly to a 1040 form), some implementations of tax program 100 may provide an input mechanism whereby the user inputs necessary data and information into input fields on data entry displays presented to the user by tax program 100 as electronic tax documents. Note that data and/or information from other sources, which may include but is not limited to data and/or information from a previous tax return, from other data entry displays, or from other electronic tax documents related to the preparation of the tax return 120 under preparation, may be transferred into or used in the calculation of values for some fields in the data entry displays. Data and information from the data entry displays may then be automatically transferred into the appropriate locations on electronic tax return documents (e.g., onto an electronic 1040 form) and/or onto other data entry displays. The tax program 100 may perform any necessary calculations using the data and information from the data entry displays, and possibly data and information from other sources such as previous tax returns, to generate appropriate calculated values for certain fields of the tax return documents.

In addition to preparer-entered or transferred values, tax program 100 may perform various calculations to generate values for some fields in electronic tax documents. Note that inputs to a particular calculation to generate a value for a field may include one or more values from one or more sources. One or more data values entered by the preparer via the data entry user interface may be used in calculations to generate new values from some fields in electronic tax documents. In some cases, one or more values from previous tax return information may be used in calculations to generate new values for some fields. Calculated values or values from fields on electronic tax documents may be used as input into other calculations. Also note that some values used in calculations may be coded as "constants" into the tax program, or alternatively may be read into the tax program from a stored data file as needed.

Typically, the tax preparer will enter necessary data and information via the user interface of the tax program 100, and, when done, access the user interface to direct the tax program 100 to complete the tax return 120 under preparation. The tax program 100 may perform any necessary calculations using the entered data and information and in accordance with tax formulas relevant to the particular tax return 120 under preparation, and possibly data and information from other sources such as previous tax returns or other tax-related documents, to generate appropriate calculated values for certain fields of the tax return 120 under preparation.

The completed tax return 120 may indicate that the taxable entity owes taxes to the tax authority or that the taxable entity is owed a tax refund from the tax authority. The tax return 120 may then be filed with the tax authority. For example, the electronic tax document(s) of the tax return may be electronically transmitted to the tax authority. Alternatively, the tax document(s) may be printed and mailed or otherwise delivered to the tax authority. If taxes are due, the tax amount may be paid to the tax authority by the taxable entity at the time of filing or, in some cases, may be deferred. The tax payment may be transferred electronically from an account (e.g., a bank account or credit card account) of the taxable entity (i.e., and electronic funds transfer (EFT)) or alternatively may be paid by check. If a refund is due, the refund amount may be paid to the taxable entity by the tax authority either electronically to an account (e.g., a bank account) of the taxable entity or by check.

A taxable entity may be required to file tax returns 120 with two or more tax authorities. For example, in some States, residents may be required to file both Federal and State income tax returns 120. As another example, many municipalities and districts require residents to pay property taxes. In these and other cases where a taxable entity has tax obligations to two or more tax authorities, tax program 100 may be used to prepare a separate tax return 120 for each tax authority with which the taxable entity is required to file a tax return 120. In some cases, a taxable entity may end up owing taxes to a first tax authority while being due a refund from a second tax authority. Conventionally, in these cases, the taxable entity pays the taxes to the first tax authority, and separately receives a refund from the second tax authority.

Figure 2A:
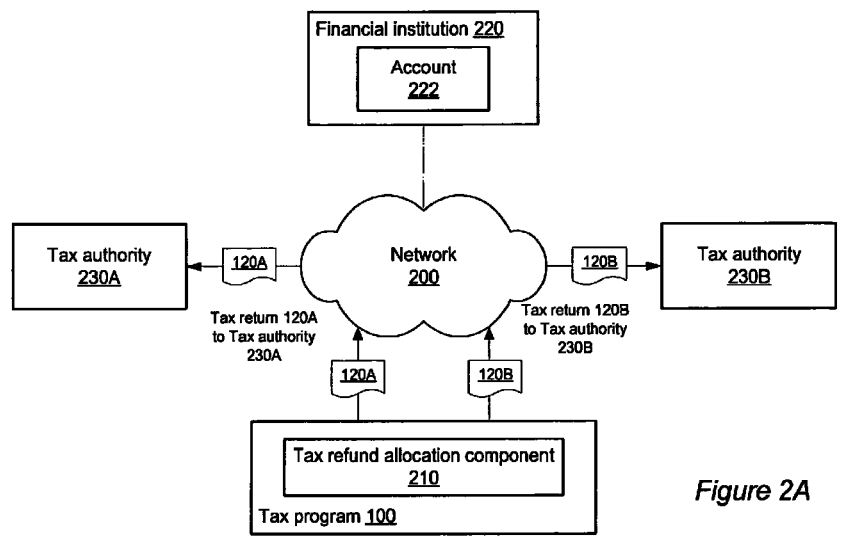
FIGS. 2A through 2C illustrate a tax refund allocation mechanism which may be used to direct at least a portion of a refund due from one tax authority to pay at least a portion of taxes owed to another tax authority according to one embodiment.
Figure 2B:
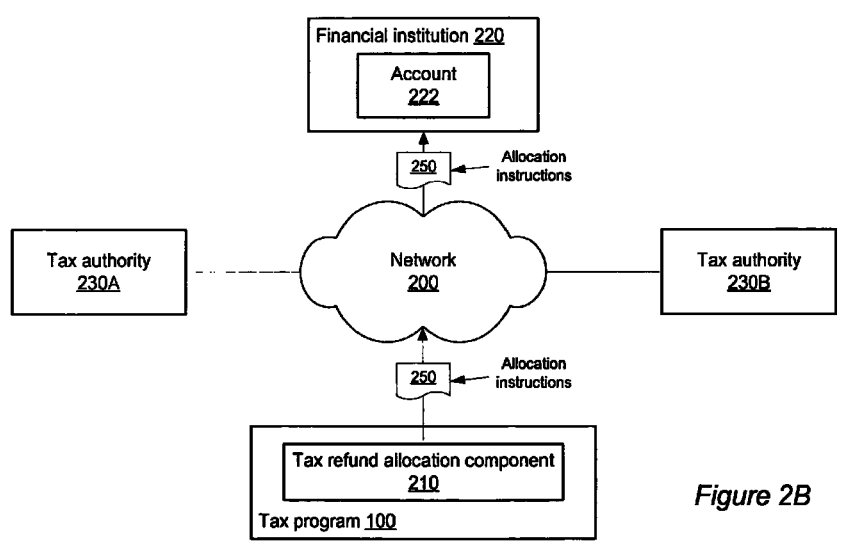
Figure 2C:
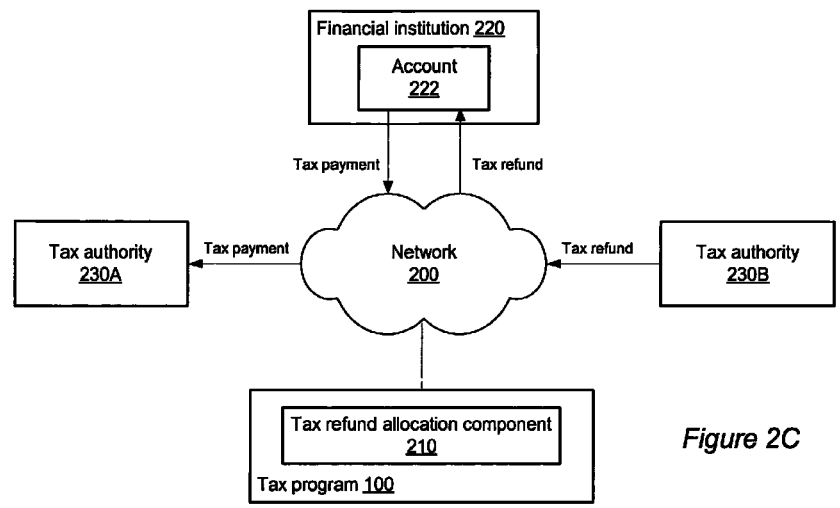

Embodiments may provide a tax refund allocation mechanism that allows a taxable entity to allocate or direct at least a portion of a refund due according to a tax return to one tax authority to pay at least a portion of taxes owed to another tax authority. FIGS. 2A through 2C illustrate a tax refund allocation mechanism which may be used to direct at least a portion of a refund due from one tax authority to pay at least a portion of taxes owed to another tax authority according to one embodiment. Note that, while tax refund allocation component 210 is illustrated in FIGS. 2A through 2C as a component internal to, or module of, tax program 100, in some embodiments tax refund allocation component 210 may be implemented as a separate application, utility or module, or as a module or component of another application.

In FIG. 2A, two or more tax returns 120 may be prepared for a taxable entity using tax program 100, for example according to the refund preparation method using tax program 100 as described above for FIG. 1. In this example, two tax returns 120 are prepared: tax return 120A for tax authority 230A, and tax return 120B for tax authority 120B. Once the tax returns 120 are prepared, the returns may be sent to the respective tax authorities 230. In this example, the two prepared tax returns 120 are illustrated as being transmitted electronically to the respective tax authorities 230 via network 200. Note that, alternatively, one or both tax returns 120 may be printed and mailed, or otherwise delivered, to the respective tax authority 230, or submitted to the respective tax authority via some other means (e.g., via facsimile (fax)).

Tax program 100 may include one or more user interface elements or items that enable the preparer to direct the tax program 100 to complete and submit the tax returns 120. FIG. 5 illustrates an exemplary user interface for preparing and completing tax returns 120. In one embodiment, as part of the completion process, the tax program 100 may include one or more user interface elements that permit the preparer to specify the allocation of refunds, if any, due from one or more tax authorities 230, if so desired. FIGS. 6A through 6E illustrate exemplary user interface elements for directing the allocation of refunds. Note that, in one embodiment, the tax program 100 may include one or more user interface elements that permit the preparer to specify the allocation of refunds, if any, due from one or more tax authorities 230, if so desired, prior to or subsequent to the completion process.

Note that electronic funds transfers are typically handled through one or more intermediary financial institutions or services. In FIGS. 2A through 2C, financial institution 220 represents an institution or service that serves as an intermediary between tax authorities (or other institutions) and taxable entities. Tax program 100 may be configured to direct electronic funds transfers through financial institution 220. In one embodiment, a taxable entity may have a permanent or temporary account 222 with financial institution 220 into which electronic funds (e.g., tax refunds) are paid and from which electronic funds (e.g., tax payments) are transferred. Note that the account 222 (and taxable entity) may have an associated routing number for use in electronic funds transfers to and from the account 222. Similarly, other accounts at other institutions may have associated routing numbers for use in electronic funds transfers.

In FIG. 2B, tax refund allocation component 210 of tax program 100 may be used by the preparer to specify allocation of any tax refunds due according to prepared tax returns 120, and to submit allocation instructions 250 to financial institution 220. For example, tax return 120B may indicate that the taxable entity is due a refund from tax authority 230B, while tax return 120A may indicate that the taxable entity owes taxes to tax authority 230A. The preparer may use the tax refund allocation component 210 to direct the allocation of at least a portion of the tax refund due from tax authority 230B to pay at least a portion of the taxes due to tax authority 230A. Tax program 100 may include one or more user interface elements that permit the preparer to specify the allocation of refunds, if any, due from one or more tax authorities 230, if so desired. FIGS. 6A through 6E illustrate exemplary user interface elements for directing the allocation of refunds.

In one embodiment, allocation instructions 250 may be transmitted electronically as one or more messages to financial institution 220 via network 200. Any of various message formats and protocols may be used to transmit allocation instructions 250. Alternatively, allocation instructions 250 may be submitted to financial institution 220 via one or more other methods or mechanisms, for example via email, telephone, or standard postal mail. FIG. 4 illustrates exemplary format and content of an allocation instructions 250 message according to one embodiment.

In one embodiment, tax refund allocation component 210 of tax program 100 may also be configured to message one or both of tax authorities 230 to inform the tax authorities 230 of at least relevant parts of the allocation instructions 250. For example, tax refund allocation component 210 may message tax authority 230A to inform the tax authority that the taxable entity's due taxes will be paid at least in part by a funds transfer from a tax refund to be received from tax authority 230B. Tax refund allocation component 210 may also message the taxable entity to inform the taxable entity that the specified allocation instructions 250 are approved (or rejected, if there is some reason why the allocation instructions 250 cannot be followed). Tax refund allocation component 210 may also message the taxable entity to inform the taxable entity of the status of the specified tax allocation. Messaging may be performed by any of various mechanisms, including, but not limited to, email, telephone, text messaging, and postal mail.

In FIG. 2C, tax authority 230B electronically transfers the refund amount due to the taxable entity according to tax return 120B to account 222 at financial institution 220. At least a portion of the tax refund from tax authority 230B may then be electronically transferred to tax authority 230A from account 222 to pay at least a portion of the taxes due to tax authority 230A according to tax return 120A. In one embodiment, tax refund allocation component 210 may be configured to message the taxable entity to inform the taxable entity of the completion of the specified tax allocation.

Figure 3:
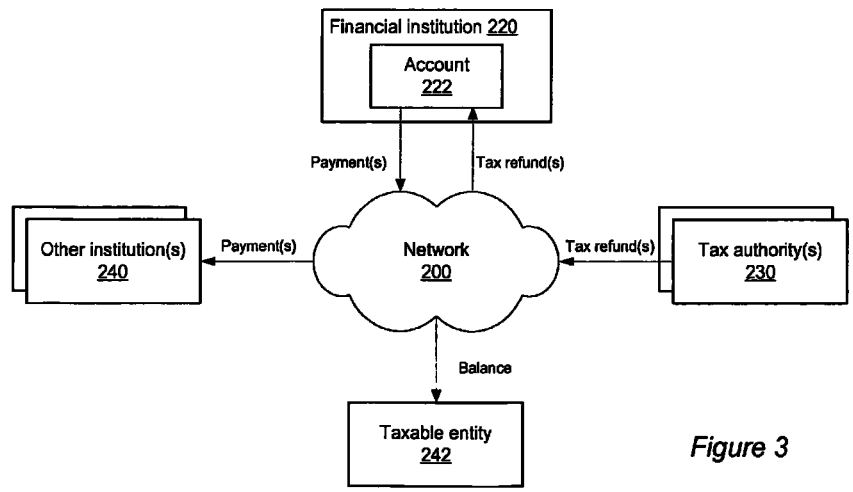
FIG. 3 illustrates a generalized tax refund allocation mechanism for directing at least a portion of a refund due from one or more tax authorities to make payment(s) to one or more other institutions, according to one embodiment.

In one embodiment, the tax refund allocation mechanism may also be used to allocate or direct at least a portion of tax refunds to other entities or institutions than tax authorities, such as to pay portions or all of credit card or other debts to various financial institutions, bills or debits such as utility bills, etc. FIG. 3 illustrates a generalized tax refund allocation mechanism for directing at least a portion of a refund due from one or more tax authorities to make payment(s) to one or more other institutions, according to one embodiment. In this embodiment, allocation instructions 250 may specify one or more institutions 240, which may but do not necessarily include tax authorities 230 to which the taxable entity 242 owes taxes, to which a portion or all of tax refund(s) 230 due from tax authority(s) 230 are to be allocated. The exemplary format and content of an allocation instructions 250 message illustrated in FIG. 4 shows a section for indicating other institutions 240 to which at least a portion of tax refund(s) are to be allocated. FIGS. 6D and 6E illustrate user interface elements for directing the allocation of at least a portion of a tax refund to other institutions 240.

Note that other institutions 240 may be any type of institution, and payments to the other institutions may be for any of a variety of purposes. The institutions 240 may include, but are not limited to: tax authorities; governmental licensing authorities; institutions that provide credit and/or debit cards; financial institutions of various types; retail or wholesale businesses; not-for-profit institutions including charities; utilities (e.g., electrical); etc. The payments may be to pay credit card or other debts or bills; to pay at least a portion of a debt owed for the purchase of goods or services; to pay vehicle or other licensing fees; charity donations or donations to other not-for-profit institutions; to pay bills such as utility bills; and so on. Further note that the payments to other institutions may be made via electronic funds transfer or by other methods, such as by check.

Further note that, if there is a positive balance of funds from a tax refund left in account 222 after payment(s) to institution(s) 240, the balance may be forwarded to the taxable entity 242. For example, the balance, if any, may be electronically transferred to a bank account of taxable entity 242. Alternatively, a check may be cut and mailed to taxable entity 242. As another alternative, the balance may be left in account 222 at the direction of taxable entity 242 for possible future allocation to make payments to other institutions 240, including other tax debts to tax authority(s) 230. Also note that taxable entity 242 may be an individual or corporate (e.g., business) entity. Further, taxable entity 242 may represent two persons that file joint tax returns.

Note that it may be the case that a tax payment due to one tax authority 230 (or a payment due to another institution) is required to be paid before a tax refund from another tax authority 230 is received. In one embodiment, financial institution 220 may provide account 222 as an escrow account to the taxable entity, and/or may provide one or more services that allow the advanced payment of taxes to a first tax authority 230 (or payment to another institution) prior to the receipt of a tax refund from a second tax authority 230 for which at least a portion has been allocated to pay the taxes to the first tax authority (or to pay the other institution). In other words, the financial institution 220 may extend a line of credit to the taxable entity that will pay an outstanding debt in advance of receiving a tax refund for which a portion is allocated to pay the debt as indicated in allocation instructions 250. When the refund is received, the amount necessary to clear the credited amount (and possibly any charges for the service) is allocated to the financial institution 220. The financial institution 220 may provide this service free of charge, or alternatively may charge a fee (e.g., a flat fee, a daily fee, or some other type of fee such as a fee based on the amount of the credit extended), or interest for the credit service. Other alternatives for charging for the service are possible and contemplated; for example, the financial institution 220 may provide the "loan" for a period (e.g., on week) with no charge, and if the refund has not been received after the period, may charge a fee or charge interest.

In one embodiment, tax refund allocation component 210 of tax program 100 may be configured to message tax authority(s) 230 and/or institution(s) 240 to inform the tax authority(s) 230 and/or institution(s) 240 of at least relevant parts of the allocation instructions 250. For example, tax refund allocation component 210 may message an institution 240 to inform the institution 240 that the taxable entity's debt or bill will be paid at least in part by a funds transfer from a tax refund to be received from a tax authority 230. Tax refund allocation component 210 may also message the taxable entity to inform the taxable entity that the specified allocation instructions 250 are approved (or rejected, if there is some reason why the allocation instructions cannot be followed). Tax refund allocation component 210 may also message the taxable entity to inform the taxable entity of the status of a specified tax allocation, for example of the completion of the specified tax allocation. Messaging may be performed by any of various mechanisms, including, but not limited to, email, telephone, text messaging, and postal mail.

In regards to FIGS. 2A through 2C and FIG. 3, note that it is possible and contemplated that, in one embodiment, tax refund allocation mechanism may be configured to operate without the services provided by financial institution 220. In this embodiment, one tax authority 230 (e.g., tax authority 230B) from which a tax refund is due may be instructed to directly pay at least a portion of a tax payment due to another tax authority (e.g., tax authority 230A) from the tax refund. In this embodiment, at least a portion of a tax refund from one tax authority 230 may be directly transferred (through electronic funds transfer, via check, or via some other mechanism) to another tax authority 230 to which taxes are owed. Note that allocation instructions 250 would be directed to the appropriate tax authorities 230. Further note that this embodiment may also be configured to directly transfer at least a portion of a tax refund due from a tax authority 230 to other institutions than tax authorities 230.

FIG. 4 illustrates exemplary allocation instructions that may be sent from a tax program to a financial institution (e.g., financial institution 220 of FIGS. 2A through 2C and FIG. 3) that serves as a funds transfer intermediary for taxable entities, tax authorities, and other institutions, according to one embodiment. In one embodiment, one or more allocation instruction messages 250 may be electronically transmitted from tax refund allocation component 210 of tax program 100 to financial institution 220 via a network 200, as illustrated in FIG. 2B.

Content of an allocation instruction message 250 may include identification information for taxable entity 242. This identification information may include one or more of, but is not limited to: the entity's name, address, phone number, e-mail address, routing information or routing number for electronic funds transfer, account number or other account information with financial institution 220, account information for other financial institutions used by the entity (e.g., the entity's bank account information), password or other security credentials, and so on. Note that, in one embodiment, allocation instruction message 250 may include, in identification information for taxable entity 242, only a minimal amount needed to identify the taxable entity and to authenticate the message; other information related to the taxable entity may have been previously transmitted to and stored by financial institution 220, and may be associated with the taxable entity via the information included in message 250. Also note that taxable entity 242 may be an individual or corporate (e.g., business) entity. Further, taxable entity 242 may represent two persons that file joint tax returns.

Content of allocation instruction message 250 may also include indications of one or more tax authorities from which tax refunds are due, and amount(s) due from the tax authority(s). In this example, allocation instruction message 250 indicates that a tax refund is due from tax authority 230B as illustrated in FIGS. 2A through 2C. A refund amount is also indicated. In one embodiment, allocation instruction message 250 may also indicate desired distributions of the refund to one or more other institutions, which may include other tax authorities, and the amounts to be allocated from the refund to the other institutions. In this example, allocation instruction message 250 indicates that a portion of the tax refund due from tax authority 230B is to be allocated to tax authority 230A as illustrated in FIGS. 2A through 2C.

In one embodiment, content of allocation instruction message 250 may also include indications of one or more tax authorities to which tax payments are due, and may specify source(s) for paying the tax payments. These sources may include allocation of funds from refunds from other tax authorities and/or payment via other institutions or sources, such as credit cards or personal check. In this example, allocation instruction message 250 indicates a tax obligation to tax authority 230A and the amount of the obligation. Allocation instruction message 250 further indicates that at least a portion of the tax obligation is to be paid from the tax refund due from tax authority 230B. Allocation instruction message 250 may further indicate one or more other sources for paying the balance of the tax obligation.

Exemplary User Interface

FIG. 5 illustrates an exemplary, generic display and user interface for preparing tax returns that may be provided by a tax program, such as tax program 100 illustrated in FIG. 1 and FIGS. 2A through 2C, according to one embodiment. In one embodiment, the display may include one or more of, but is not limited to, a menu bar 352, a tool bar 354, and a tab bar 356. Menu bar 352 may provide one or more menus for accessing various functionalities of tax program 100 via user-selectable interface items (menu selections). Tool bar 354 may provide one or more tool icons for accessing various tools of tax program 100. Tab bar 356 may provide one or more tabs for switching between various views presented to the tax preparer. Different areas for preparing tax returns 120 for different tax authorities may be identified as different modules in the tax program 100. The currently selected tab displays forms for various modules. The user interface may provide one or more user interface items for selecting among modules and among electronic documents of selected modules. As an example, the Forms tab includes, on the left, a selection area to select a module from a list of modules. Module 1 is shown in bold text to indicate that it is currently selected. The Forms tab may also include a selection area to select a form (electronic document) of a selected module from a list of forms for the module. Form 1 is shown in bold text to indicate that it is currently selected. The Forms tab displays a current tax document 320 (Form 1). Note that these user interface items are exemplary, and that a person skilled in the art will recognize that other user interface mechanisms and items may be used to select among modules and forms. Further note that current tax document 320 is intended to be representative of both tax return documents (e.g., 1040, 1040A, 1040EZ, 1040NR, and 1040X forms of a Federal tax return) presented as templates for data entry by the user and of data entry displays that include input fields for entering data and information to be transferred into tax return documents.

Current tax document 320 may include multiple fields 322. Values in these fields 322 may include, for example, values entered by the preparer via the user interface, values transferred from a previous tax return or from other documents in the tax return 120 under preparation, and/or calculated values. Calculated values may be calculated from one or more other values, including values transferred from a previous tax return or other tax-related document, values entered by the preparer via the user interface, and values from other fields. In some cases, calculated values displayed in one field 322 may be used in calculating a value for another field 322.

Typically, the tax preparer will enter necessary data and information via the user interface of the tax program 100, and, when done, access the user interface to direct the tax program 100 to complete the tax return 120 under preparation. FIG. 5 illustrates an exemplary user interface item (Complete Tax Return 330) that may be selected by the preparer to direct tax program 100 to complete the tax return 120 under preparation. Note that these user interface items are exemplary, and that a person skilled in the art will recognize that other user interface mechanisms and items may be used to direct tax program 100 to complete the tax return 120 under preparation. As one example, a menu in menu bar 352 may be accessed by the preparer that includes a menu item that may be selected to direct tax program 100 to complete the tax return 120 under preparation. As another example, tool bar 354 may include a tool icon that may be selected to direct tax program 100 to complete the tax return 120 under preparation. To complete the tax return 120 under preparation, the tax program 100 may perform any necessary calculations using the entered data and information and in accordance with tax formulas relevant to the particular tax return 120 under preparation, and possibly data and information from other sources such as previous tax returns or other tax-related documents, to generate appropriate calculated values for certain fields of the tax return 120.

Tax program 100 may provide one or more user interface elements for a tax refund allocation component 210 of tax program 100. FIGS. 6A through 6E and FIGS. 7A and 7B illustrate exemplary user interface elements for a tax refund allocation component of a tax program 100 according to various embodiments.

In one embodiment, tax refund allocation component 210 may be automatically invoked as part of the completion process of the tax return 120 under preparation. In one embodiment, tax refund allocation component 210 may only be invoked if there is a refund due from the tax authority for which the return 120 is being prepared. In one embodiment, during the completion process, the preparer may be given the option to invoke the tax refund allocation component 210. Alternatively, or in addition, tax program 100 may provide one or more user interface items that may be selected before, during, or after the completion process to invoke tax refund allocation component 210. As one example, a menu in menu bar 352 may be accessed by the preparer that includes a menu item that may be selected to direct tax program 100 to invoke tax refund allocation component 210. As another example, tool bar 354 may include a tool icon that may be selected to invoke tax refund allocation component 210.

FIGS. 6A through 6E illustrate exemplary user interface elements for a tax refund allocation component of a tax program 100 according to one embodiment. In one embodiment, during the completion process, if a tax refund is due, a first display, such as exemplary display 400A illustrated in FIG. 6A, may be automatically displayed. Alternatively, display 400A may be invoked by the user after the completion process by selecting a user interface item (e.g., a menu item or tool icon) in tax program 100.

In FIG. 6A, exemplary display 400A may include an indication of the tax authority from which a refund is due, and an amount of the refund. In this example, a refund of $1,125 is due from the federal government (IRS). Display 400A may also include an indication of another tax authority (or authorities) to which taxes are owed, and an indication of how much is owed to the other tax authority. In this example, taxes of $327 are due to the state of California. One or more user interface items may also be included that allow the preparer to indicate if some or all of the refund due from the first tax authority is to be applied to the taxes owed to the second tax authority. In the exemplary display 400A, the user may select either the "yes" or the "no" checkbox to indicate whether some or all of the refund due from the first tax authority is to be applied to the taxes owed to the second tax authority. One of ordinary skill in the art will recognize that other user interface items may be used to so indicate a selection.

Display 400A may also include other user interface items. For example, display 400A may include a "cancel" user interface item that may be selected to cancel the completion process, or alternatively to exit the tax refund allocation process and continue the completion process. In one embodiment, the entered or calculated data of the tax return under preparation may be persisted if the "cancel" user interface item is selected (or the user otherwise navigates away from the current process) so that the data is available and displayed if the preparer later resumes the tax preparation process. Display 400A may also include "back" and "next" user interface items to proceed to the previous or the next display of the completion process, respectively.

In one embodiment, if the preparer selects the "yes" user interface item of display 400A in response to display 400A asking if some or all of the refund due from the first tax authority is to be applied to the taxes owed to the second tax authority, then the completion process may proceed to display 400B illustrated in FIG. 6B to continue the refund allocation. If the preparer selects the "no" user interface item of display 400A, then the completion process may continue as normal without performing refund allocation. In one embodiment, the preparer may continue in the process in either case by selecting the "next" user interface item.

FIG. 6B illustrates an exemplary display 400B that may be presented to the preparer, for example, in response to the preparer selecting "yes" in display 400A in response to display 400A asking if some or all of the refund due from the first tax authority is to be applied to the taxes owed to the second tax authority. Display 400B may ask the preparer how much of the refund from the first tax authority is to be applied to the taxes owed to the second tax authority, and may include a user interface item that allows the preparer to specify the amount. Display 400B may also indicate how much is owed to the second tax authority, the amount from the refund applied to the tax debt owed to the second tax authority, and the balance of the debt to the second tax authority. In this example, the preparer has specified that $327 from the refund due from the first tax authority (the Federal government, in this example) is to be allocated to pay the taxes due to the second tax authority (the state of California, in this example). Since, in the exemplary display 400A, the taxable entity owes $327 to the state of California, a balance of $0 is indicated in FIG. 400B.

Display 400B may also include other user interface items. For example, display 400B may include a "cancel" user interface item that may be selected to cancel the completion process, or alternatively to exit the tax refund allocation process and continue the completion process. In one embodiment, the entered or calculated data of the tax return under preparation may be persisted if the "cancel" user interface item is selected (or the user otherwise navigates away from the current process) so that the data is available and displayed if the preparer later resumes the tax preparation process. Display 400B may also include "back" and "next" user interface items to proceed to the previous or the next display of the completion process, respectively.

In one embodiment, if the balance of the tax debt to the second tax authority is greater than zero, then the refund allocation process may proceed to a next display 400C as illustrated in FIG. 6C. If the balance of the tax debt to the second tax authority is $0, as in this example, then the refund allocation process may proceed to a next display 400D as illustrated in FIG. 6D. In one embodiment, the preparer may proceed in the process in either case by selecting the "next" user interface item.

FIG. 6C illustrates an exemplary display 400C for specifying a payment method or methods for any balance remaining in a tax debt to the second tax authority. Display 400C may be displayed upon selecting the "next" user interface item of display 400B if display 400B indicates a balance remaining greater than $0. Display 400C may indicate how much is owed to the second tax authority, how much of the refund from the first tax authority has been applied to the tax debt due to the second tax authority, and a balance of the tax debt due to the second authority. In this example, display 400C indicates that the taxable entity owes the state of California $327.00, that a payment of $127.00 has been applied to the tax debt due to the state of California (from the refund due from the first tax authority, e.g. the Federal government), and that a balance of $200.00 is due to the State of California. Display 400C may include one or more user interface items for selecting the payment method for the balance of the taxes due to the tax authority. In this example, display 400C includes a selection for indicating that the payment is to be made by check, and another selection for indicating that the payment is to be made by electronic funds transfer (EFT), for example from a credit card or debit card, or from some other account, of the taxable entity. Note that other user interface items for selecting other payment methods may be included in display 400C.

Display 400C may also include other user interface items. For example, display 400C may include a "cancel" user interface item that may be selected to cancel the completion process, or alternatively to exit the tax refund allocation process and continue the completion process. In one embodiment, the entered or calculated data of the tax return under preparation may be persisted if the "cancel" user interface item is selected (or the user otherwise navigates away from the current process) so that the data is available and displayed if the preparer later resumes the tax preparation process. Display 400C may also include "back" and "next" user interface items to proceed to the previous or the next display of the completion process, respectively. In one embodiment, selecting the "next" user interface item may exit the refund allocation process and take the preparer to a next display in the completion process. In one embodiment, selecting the "next" user interface item may take the preparer to a next display in the refund allocation process, such as display 400D as illustrated in FIG. 6D.

FIG. 6D illustrates an exemplary display 400D that may be invoked directly from display 400B illustrated in FIG. 6B if the balance due to the second tax authority is $0. In one embodiment, display 400D may also be invoked from display 400C as illustrated in FIG. 6C. Display 400D may indicate a balance remaining in the refund due from the first tax authority. In this example, display 400D indicates that $798 remains in the tax refund due from the Federal government.

One or more user interface items may also be included in display 400D that allow the preparer to indicate if some or all of the balance of the refund due from the first tax authority is to be applied to debts due to other institutions, such as credit card debts. Note that, in one embodiment, at least a portion of the balance of the refund may be allocated to institutions for other purposes than to be applied towards debts, for example as a donation to a charitable or other non-profit organization. Further note that, in one embodiment, display 400D may include user interface items that allow the preparer to select another, third tax authority to which at least a portion of the balance of the refund due from the first tax authority is to be allocated. In the exemplary display 400D, the user may select either a "yes" or a "no" checkbox to indicate whether some or all of the refund due from the first tax authority is to be applied to debts due to other institutions. One of ordinary skill in the art will recognize that other user interface items may be used to so indicate a selection.

Display 400D may also include other user interface items. For example, display 400D may include a "cancel" user interface item that may be selected to cancel the completion process, or alternatively to exit the tax refund allocation process and continue the completion process. In one embodiment, the entered or calculated data of the tax return under preparation may be persisted if the "cancel" user interface item is selected (or the user otherwise navigates away from the current process) so that the data is available and displayed if the preparer later resumes the tax preparation process. Display 400D may also include "back" and "next" user interface items to proceed to the previous or the next display of the completion process, respectively.

In one embodiment, if the preparer selects the "yes" user interface item of display 400D, then the completion process may proceed to display 400E illustrated in FIG. 6E to continue the refund allocation for other institutions. Note that, in one embodiment, if the preparer specifies another tax authority to which at least a portion of the refund is to be allocated via display 400D of FIG. 6D, then the completion process may instead proceed to display 400B of FIG. 6B to allow the preparer to specify how much of the refund is to be allocated to the other tax authority. If the preparer selects the "no" user interface item of display 400D, then the completion process may continue as normal without performing any further refund allocations. In one embodiment, the preparer may continue in the process in either case by selecting the "next" user interface item.

FIG. 6E illustrates an exemplary display 400E via which the preparer may specify portions of the refund to be allocated to one or more other institutions. Display 400E may include a user interface item whereby the preparer may enter or otherwise indicate an institution to which a portion of the refund balance is to be allocated. In one embodiment, selecting the user interface item may cause a menu to be displayed, the menu indicating one or more user-selectable institutions to which portions of the refund may be allocated. Display 400E may also include a user interface item that, when invoked, displays a search interface element that allows the user to search for institutions. Display 400E may also include a user interface item that allows the user to enter an account number of the taxable entity with a selected institution. Display 400E may also include a user interface item that allows the user to specify an amount from the refund to be paid to a selected institution. In this example, the preparer has specified an entity XYZ, an account number for the taxable entity of 12345678, and an amount of $65.47 to be paid to the selected institution from the tax refund balance. Note that embodiments may allow the preparer to specify one or more institutions to which portions of the tax refund balance are to be allocated as long as there is sufficient balance remaining in the refund.

In one embodiment, the search user interface item described above may, when selected, search for an indicated institution in a database and, if the institution is found, ask for the taxable entity's account number, and then proceed with the transaction. If the indicated institution is not found, one embodiment may provide user interface elements whereby the preparer may enter the name and billing address of the institution, along with the taxable entity's account information. In one embodiment, if electronic funds transfer is not possible to a specified institution, then a check may be cut and physically mailed to the specified institution.

Note that, in one embodiment, a financial institution such as financial institution 220 illustrated in FIGS. 2A through 2C and FIG. 3 may act as an intermediary institution between the tax authority from which a refund is due and any other tax authorities or other institutions to which portions of the refund are allocated. The intermediary financial institution 220 may receive the refund from the first tax authority and distribute the allocated portions to the indicated other tax authorities or institutions, either by electronic funds transfer or by check. Further note that, at the completion of the refund allocation process as indicated in FIGS. 6A through 6E, an allocation instructions 250 message as indicated in FIG. 2B and as illustrated in FIG. 4 may be sent from the tax program 100 to the financial institution 220.

Display 400E may also include other user interface items. For example, display 400E may include a "cancel" user interface item that may be selected to cancel the completion process, or alternatively to exit the tax refund allocation process and continue the completion process. In one embodiment, the entered or calculated data of the tax return under preparation may be persisted if the "cancel" user interface item is selected (or the user otherwise navigates away from the current process) so that the data is available and displayed if the preparer later resumes the tax preparation process. Display 400E may also include "back" and "next" user interface items to proceed to the previous or the next display of the completion process, respectively.

FIGS. 7A and 7B illustrate exemplary alternative displays that may be provided as part of the refund allocation process according to one embodiment. In one embodiment, during the completion process, if a tax refund is due, a first display, such as exemplary display 500A illustrated in FIG. 7A, may be automatically displayed. Alternatively, display 500A may be invoked by the user after the completion process by selecting a user interface item (e.g., a menu item or tool icon) in tax program 100. FIG. 7A illustrates an alternative first display 500A that may include an indication of the tax authority from which a refund is due, and an amount of the refund. One or more user interface items may also be included that allow the preparer to indicate if the taxable entity wishes to allocate some or all of the refund due from the indicated tax authority to taxes owed to other tax authorities or to other institutions. In one embodiment, if the preparer selects the "yes" user interface item of display 500A in response to display 500A asking if some or all of the refund due from the indicated tax authority is to be allocated another tax authority or institution, then the process may proceed to display 500B illustrated in FIG. 7B to continue the refund allocation.

FIG. 7B illustrates an exemplary display 500B that may include one or more user interface items that allow the preparer to select a tax authority or other institution to which a portion or all of the tax refund balance is to be allocated. If a tax authority is selected, the process may proceed to another display similar to display 400B illustrated in FIG. 6B. If a financial institution is selected, the process may proceed to another display similar to display 400E illustrated in FIG. 6E. Note that the user interfaces may provide user interface elements that allow the user to continue the process to specify additional tax authorities and/or institutions to which portions of the refund are to be allocated.

Figure 8:
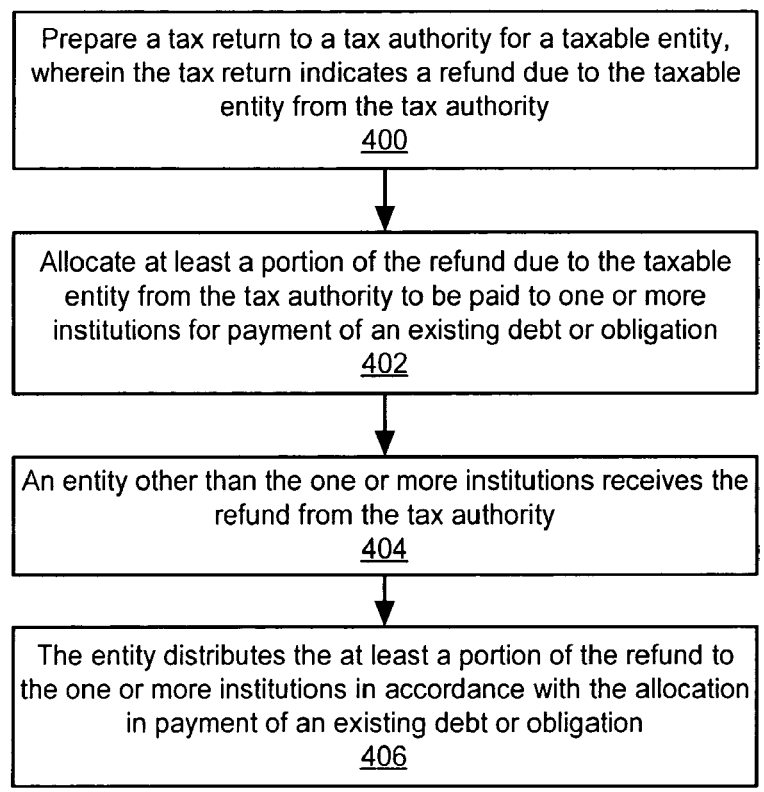
FIG. 8 is a flowchart of a method for tax refund allocation according to one embodiment.

FIG. 8 is a flowchart of a method for tax refund allocation according to one embodiment. As indicated at 400, a tax return to a tax authority for a taxable entity may be prepared, for example using a tax program as illustrated in FIG. 1 that provides an exemplary user interface as indicated in FIG. 5. The tax return may indicate a refund due to the taxable entity from the tax authority. As indicated at 402, at least a portion of the refund due to the taxable entity from the tax authority may be allocated to be paid to one or more institutions for payment of an existing debt or obligation of the taxable entity. Exemplary user interfaces that may be implemented by a tax refund allocation component of a tax program are illustrated in FIGS. 6A through 6E and in FIGS. 7A and 7B. These user interfaces may be used to prompt for and receive user input specifying the allocation, including institutions to which portions of the refund are to be allocated and amounts to be allocated to the institutions.

The one or more institutions may include another tax authority. A separate tax return to the other tax authority may be prepared for the taxable entity. The separate tax return may indicate taxes due to the tax authority from the taxable entity. A portion of the refund may be allocated to be paid to the other tax authority as payment for at least a portion of the taxes due to the other tax authority.

In one embodiment, the method may include specifying one or more other payment methods for paying balances of existing debts or obligations due to the one or more institutions by the taxable entity if the portion of the refund allocated to the institutions is insufficient to cover the existing debts or obligations due to the institutions. The exemplary user interfaces that may be implemented by a tax refund allocation component of a tax program as illustrated in FIGS. 6A through 6E and in FIGS. 7A and 7B may include user interface items for specifying the other payment methods.

In one embodiment, information specifying tax refund allocation instructions to an entity, for example an intermediary financial institution, that serves as an intermediary between the taxable entity, the tax authority, and the one or more institutions. The tax refund allocation instructions may indicate the allocation of portions of the refund due to the taxable entity from the tax authority to specific ones of the one or more institutions for payment of an existing debt or obligation of the taxable entity.

As indicated at 404, the refund from the tax authority may be received by an entity other than the one or more institutions. In one embodiment, the refund is received by an intermediary financial institution. In one embodiment, the refund is received in accordance with an electronic funds transfer (EFT) mechanism. As indicated at 406, the allocated portion of the refund is then distributed to the one or more institutions in accordance with the tax refund allocation instructions in payment of existing debts or obligations.

In one embodiment, the tax refund allocation mechanism may be configured to message tax authority(s) and/or institution(s) to inform the tax authorities and/or institutions of at least relevant parts of the allocation instructions. For example, the tax refund allocation mechanism may message an institution to inform the institution that the taxable entity's debt or bill will be paid at least in part by a funds transfer from a tax refund to be received from a tax authority. The tax refund allocation mechanism may also message the taxable entity to inform the taxable entity that the specified allocation instructions are approved (or rejected, if there is some reason why the allocation instructions cannot be followed). The tax refund allocation mechanism may also message the taxable entity to inform the taxable entity of the status of a specified tax allocation, for example of the completion of the specified tax allocation. Messaging may be performed by any of various mechanisms, including, but not limited to, email, telephone, text messaging, and postal mail.

Exemplary System

Various components of embodiments of a tax refund allocation mechanism as described herein, such as tax program 100 and tax refund allocation component 210 of FIGS. 2A through 2C, may be executed on one or more computer systems, which may interact with various other devices. One such computer system is illustrated by FIG. 9. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for the tax refund allocation mechanism, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems associated with tax authorities, financial institutions, or other institutions, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 9, memory 720 may include program instructions 725, configured to implement at least a portion of embodiments of the tax refund allocation mechanism as described herein, and data storage 735, comprising various documents, tables, databases, etc. accessible by program instructions 725. In one embodiment, program instructions 725 may include software elements of the tax refund allocation mechanism illustrated in the Figures (e.g., tax program 100 in FIG. 1 and FIGS. 2A through 2C, and tax refund allocation component 210 illustrated in FIGS. 2A through 2C) and data storage 735 may include data used in embodiments of the tax refund allocation mechanism. In other embodiments, different software elements and data may be included.

Those skilled in the art will appreciate that computer system 700 is merely illustrative and is not intended to limit the scope of the tax refund allocation mechanism as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   one or more processors;
   a display device;
   a memory coupled to the one or more processors and the display device, wherein the memory comprises program instructions executable by the one or more processors for a tax program configured to:
      prepare a tax return to a first tax authority for a taxable entity, wherein the tax return indicates a refund due to the taxable entity from the first tax authority;
      allocate the refund due to the taxable entity from the first tax authority to be paid to one or more institutions for payment of a debt or obligation of the taxable entity, wherein the debt or obligation exists before the refund is determined;
      transmit to at least one financial institution for the first tax authority, a first message comprising first tax refund allocation instructions, the first tax refund allocation instructions comprising identification information of the taxable entity, a distribution indicator to the one or more institutions, and an amount of the refund; and
      transmit to the at least one financial institution for the one or more institutions a second message comprising second tax refund allocation instructions, the second tax refund allocation instructions comprising the identification information of the taxable entity, identification of the first tax authority, the amount of the refund, and a source for paying a remaining balance of the debt or obligation,
   wherein the at least one financial institution is configured to:
      distribute the refund to the one or more institutions in payment of the debt or obligation in accordance with the first tax refund allocation instructions, and
      pay the remaining balance from the source to the one or more institutions in accordance with the second tax refund allocation instructions.

2. The system as recited in claim 1, wherein the one or more institutions include a second tax authority, and wherein the tax program is further configured to:
   prepare a separate tax return to the second tax authority for the taxable entity, wherein the separate tax return indicates taxes due to the second tax authority from the taxable entity,
   wherein said debt or obligation comprises the taxes due to the second tax authority.

3. A non-transitory computer readable storage medium comprising program instructions, wherein the program instructions are computer-executable to:
   prepare a tax return to a first tax authority for a taxable entity, wherein the tax return indicates a refund due to the taxable entity from the first tax authority;
   allocate the refund due to the taxable entity from the first tax authority to be paid to one or more institutions for payment of a debt or obligation of the taxable entity, wherein the debt or obligation exists before the refund is determined;
   transmit to at least one financial institution for the first tax authority, a first message comprising first tax refund allocation instructions, the first tax refund allocation instructions comprising identification information of the taxable entity, a distribution indicator to the one or more institutions, and an amount of the refund; and transmit to the at least one financial institution for the one or more institutions a second message comprising second tax refund allocation instructions, the second tax refund allocation instructions comprising the identification information of the taxable entity, identification of the first tax authority, the amount of the refund, and a source for paying a remaining balance of the debt or obligation, wherein the at least one financial institution is configured to:
distribute the refund to the one or more institutions in payment of the debt or obligation in accordance with the first tax refund allocation instructions, and paying the remaining balance from the source to the one or more institutions in accordance with the second tax refund allocation instructions.

4. The non-transitory computer readable storage medium as recited in claim 3, wherein the one or more institutions include a second tax authority, and wherein the tax program is further configured to:

prepare a separate tax return to the second tax authority for the taxable entity, wherein the separate tax return indicates taxes due to the second tax authority from the taxable entity, wherein said debt or obligation comprises the taxes due to the second tax authority.

\* \* \* \* \*